United States Patent
Sundin et al.

(10) Patent No.: US 11,265,816 B2
(45) Date of Patent: Mar. 1, 2022

(54) BEAM BASED UPLINK (UL) POWER CONTROL

(71) Applicant: Telefonaktiebolaget LM Ericsson (publ), Stockholm (SE)

(72) Inventors: Tomas Sundin, Sollentuna (SE); Håkan Andersson, Linköping (SE); Mattias Frenne, Uppsala (SE); Johan Furuskog, Stockholm (SE); Johan Kåredal, Lund (SE); John Skördeman, Brokind (SE); Niclas Wiberg, Linköping (SE); Qiang Zhang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 153 days.

(21) Appl. No.: 16/480,234

(22) PCT Filed: Dec. 14, 2017

(86) PCT No.: PCT/SE2017/051272
§ 371 (c)(1),
(2) Date: Jul. 23, 2019

(87) PCT Pub. No.: WO2018/139965
PCT Pub. Date: Aug. 2, 2018

(65) Prior Publication Data
US 2019/0387478 A1     Dec. 19, 2019

Related U.S. Application Data

(60) Provisional application No. 62/449,830, filed on Jan. 24, 2017.

(51) Int. Cl.
*H04W 52/14* (2009.01)
*H04B 7/06* (2006.01)
(Continued)

(52) U.S. Cl.
CPC ........ *H04W 52/146* (2013.01); *H04B 7/0617* (2013.01); *H04W 52/242* (2013.01); *H04W 52/42* (2013.01)

(58) Field of Classification Search
None
See application file for complete search history.

(56) References Cited

U.S. PATENT DOCUMENTS 6,771,929 B1 *  8/2004  Nivens ............... H04B 7/18517
                                                          370/316
8,248,976 B2 *  8/2012  Lim ..................... H04W 52/247
                                                          370/310
(Continued)

FOREIGN PATENT DOCUMENTS

CN      104067675 A    9/2014
EP      3 534 652 A1   9/2019

OTHER PUBLICATIONS

International Search Report and Written Opinion dated May 17, 2018 issued in US Patent Application No. PCT/SE2017/051272. (25 pages).

(Continued)

*Primary Examiner* — Gregory B Sefcheck
(74) *Attorney, Agent, or Firm* — Rothwell, Figg, Ernst & Manbeck, P.C.

(57) ABSTRACT

Independent power-control procedures per beam-pair link (BPL). In one embodiment, such a power-control procedure comprises: 1) an open-loop part based on the estimated DL path loss for the active and back-up (or "non-active") BPLs in the UE and 2) a closed-loop part where the UL power-control adjustment commands are transmitted from the network and accumulated in the UE independently per (Continued)

active BPL. The UL transmit power is determined from the power-control procedure associated with the active BPL scheduled for transmission.

21 Claims, 7 Drawing Sheets

(51) Int. Cl.
*H04W 52/24* (2009.01)
*H04W 52/42* (2009.01)

(56) References Cited

U.S. PATENT DOCUMENTS

| | | | | |
|---|---|---|---|---|
| 9,554,336 | B2* | 1/2017 | Ouchi | H04W 52/327 |
| 9,661,592 | B2* | 5/2017 | Seol | H04W 52/24 |
| 9,801,143 | B2* | 10/2017 | Ouchi | H04W 52/146 |
| 9,832,737 | B2* | 11/2017 | Ouchi | H04W 72/042 |
| 10,524,212 | B2* | 12/2019 | Zhou | H04W 72/0413 |
| 2013/0102345 | A1 | 4/2013 | Jung | |
| 2014/0016573 | A1 | 1/2014 | Nuggehalli et al. | |
| 2014/0315594 | A1 | 10/2014 | Jeong et al. | |
| 2014/0376466 | A1 | 12/2014 | Jeong et al. | |
| 2019/0357153 | A1* | 11/2019 | Zhang | H04W 52/243 |
| 2020/0178180 | A1* | 6/2020 | Zhang | H04W 52/146 |

OTHER PUBLICATIONS

Intel Corporation, "on Uplink Power Control", 3GPP TSG RAN WG1 NR Ad-Hoc Meeting, R1-1700358, Spokane, USA (Jan. 2017). (5 pages).

3GPP TS 36.213 V10.13.0 (Jun. 2015), 3rd Generation Partnership Project; Technical Specification Group Radio Access Network; Evolved Universal Terrestrial Radio Access (E-UTRA); Physical layer procedures (Release 10), Jun. 2015 (128 pages).

\* cited by examiner

BEAM BASED UPLINK (UL) POWER CONTROL

CROSS REFERENCE TO RELATED APPLICATION(S)

This application is a 35 U.S.C. § 371 National Stage of International Patent Application No. PCT/SE2017/051272, filed Dec. 14, 2017, designating the United States and claiming priority to U.S. provisional application No. 62/449,830, filed on Jan. 24, 2017. The above identified applications are incorporated by reference.

TECHNICAL FIELD

Disclosed are embodiments for beam based uplink (UL) power control.

BACKGROUND

The next generation mobile wireless communication system, which is referred to as "5G," will support a diverse set of use cases and a diverse set of deployment scenarios. 5G will encompass an evolution of today's 4G networks and the addition of a new, globally standardized radio-access technology known as "New Radio" (NR).

The diverse set of deployment scenarios includes deployment at both low frequencies (100s of MHz), similar to LTE today, and very high frequencies (mm waves in the tens of GHz). At high frequencies, propagation characteristics make achieving good coverage challenging. One solution to the coverage issue is to employ beamforming (e.g., high-gain beamforming) to achieve satisfactory link budget.

Beamforming is an important technology in future radio communication systems. It can improve performance both by increasing the received signal strength, thereby improving the coverage, and by reducing unwanted interference, thereby improving the capacity. Beamforming can be applied both in a transmitter and a receiver.

In a transmitter, beamforming involves configuring the transmitter to transmit the signal in a specific direction (or a few directions) and not in other directions. In a receiver, beamforming involves configuring the receiver to receive signals from a certain direction (or a few directions) and not from other directions. When beamforming is applied in both the transmitter and the receiver for a given communication link, the combination of the beam used by the transmitter to transmit a signal to the receiver and the beam used by the receiver to receive the signal is referred to as a beam-pair link (BPL). Generally, the beamforming gains are related to the widths of the used beams: a relatively narrow beam provides more gain than a wider beam. A BPL can be defined for DL and UL separately or jointly based on reciprocity assumptions.

For a more specific description of beamforming, one typically talks about beamforming weights rather than beams. On the transmission side, the signal to be transmitted is multiplied with beamforming weights (e.g., complex constants) before being distributed to the individual antenna elements. There is a separate beamforming weight for each antenna element, which allows maximum freedom in shaping the transmission beam given the fixed antenna array. Correspondingly, on the receiving side, the received signal from each antenna element is multiplied separately with the beamforming weights before the signals are combined. However, in the context of the present text, the description is easier to follow if the somewhat simplified notion of beams, pointing in certain physical directions, is adopted.

Beamforming generally requires some form of beam management, such as beam search, beam refinement, and/or beam tracking, to determine what transmit (Tx) and receive (Rx) beams to use for communication between two units. Typically, the two units are a Transmission and Reception Point (TRP) (e.g., a base station) and a user equipment (UE) (e.g., a device, such as, for example, a smartphone, a sensor, etc., that is capable of wireless communication). A UE is sometimes also referred to as a "terminal."

Beam search can involve the transmitter sweeping a signal across several beams (i.e., transmitting a signal, such as a reference signal, multiple times using different Tx beams), to allow a receiver in an unknown direction to receive the signal. Beam search can also involve the receiver scanning across several receive beams, thereby being able to receive a signal from an initially unknown direction. Beam search typically also involves the receiver sending a message to a transmitter to indicate which transmit beam or beams are best suited for transmission to that receiver.

Beam refinement is applied when a working beam or beam pair is already selected. Beam refinement is to improve an already selected beam, for instance changing its beamforming weights to obtain a narrower beam that provides a better gain.

Beam tracking is process that is used to update the selected beams, i.e., to replace the Tx or Rx beam in an existing BPL when the conditions change (e.g., due to mobility). Beam refinement and tracking are typically performed by temporarily evaluating a different beam than the one that is currently used for communication, and switching to that beam if it is deemed better than the current beam.

Beam search can take a considerable amount time when there are many beams to search for on both the transmitter and receiver side, and communication is typically not possible during this search time. Beam refinement and tracking, on the other hand, are usually ongoing activities that cause little or no disturbance to ongoing communication.

SUMMARY

Networks often transmit periodic or continuous reference signals to support beam management (e.g. by sweeping across several transmit beams as describe above). Such transmissions are here referred to as beam reference signals (BRS). Some aspects of beam management can be performed by a UE with little or no explicit involvement from the network, since the UE can assume that the network is transmitting the BRS periodically or continuously. For instance, UEs typically perform beam search as part of the system-acquisition procedure, resulting in the selection of a UE Rx beam such that by using this beam it can sufficiently well receive BRS transmitted on a certain network beam. Then the UE performs a random-access transmission using a selected Tx beam and using a transmission resource (time and/or frequency) where the UE expects the network to be able to receive random-access transmissions using that beam. UEs often continue to receive BRS even when communication is ongoing this facilitates beam search, beam refinement and beam tracking.

Many radio communication systems include some kind of radio-link supervision, whereby the quality of the communication link is regularly checked, and some action is taken in case the quality is unacceptable or the communication is lost. Radio-link supervision often involves a receiver checking the presence and/or quality of a sync signal or a reference signal. It can also involve monitoring the number of retransmissions in a retransmission protocol, and monitoring the time it takes to receive a response to an earlier transmitted request message. In case any of these checks indicate a severe problem, the device often declares a radio-link failure and initiates some action. In case of a network node having lost communication with a UE, the action can involve releasing some or all network resources related to that UE. In case of a UE having lost communication with a network, the action can involve searching for sync and reference signals from the network and, in case such signals are found, attempting to access the network again. In a beamforming system, this typically involves beam search.

In addition, networks schedule and transmit UE specific reference signals that, among other things, can be used for beam searching, beam tracking, and beam refinement. Such signals are referred to here as beam refinement reference signals (BRRS). Another example of a UE specific reference signal is the channel state information reference signal (CSI-RS). This is a reference signal scheduled by the network for one (or possibly, several) specific UE (or UEs) with the intention of providing measurement opportunities in the UE such that more detailed channel knowledge may be obtained and reported back to the network.

Further, networks (e.g., TRPs) may configure UEs to periodically transmit uplink (UL) reference signals, which are known as sounding reference signals (SRS).

To sustain a transmission link between the network and the UE over time-varying conditions (e.g. due to mobility), UEs typically consider several possible BPLs for which the beams are tracked and refined. Such BPLs that are identified jointly by the network and the UE are here referred to as monitored BPLs.

The monitored BPLs (e.g., active and non-active BPLs) can be tagged with an identifier. This tag could for example be 2 bits, allowing for 4 BPLs being identified.

In some scenarios, UE-specific CSI-RS is used for beam management and aperiodic measurements are triggered by the network. The CSI-RS can be used to initiate and or refine the active and monitored BPLs. The UE can report which TRP Tx beam it prefers for each measurement and store the preferred Rx processing configuration (such as Rx beam) for each Tx beam. Hence, the Tx-Rx beam pair is a BPL.

Out of the monitored BPLs, the network and UE agree to use at least one BPL for data and control channel reception and transmission (here referred to as the "active" BPL). Depending on its capabilities, a UE can support one or more active BPLs. The monitored BPLs that are not used as an active BPL are referred to as back-up (or non-active) BPLs.

Generally, it is desirable to balance the incoming signal strength at the network receiver (i.e., the TRP) for all transmitting users in a cell to reach a target signal-to-interference-plus-noise ratio (SINR) and minimize the overall interference spread to neighboring cells. This is partly handled by an UL power-control procedure. The UL power-control procedure consists of a UE adjusting its output power based on different types of input and is typically based on two main parts: 1) an open-loop part based on DL measurements of path loss in the UE using some reference signal; and 2) a closed-loop part where power-control adjustments are signaled from the network to the UE (e.g., signaled over the physical downlink control channel) and accumulated in the UE. The combined usage of these two parts are usually configured using some higher-layer signaling. Both cell-specific and user-specific parameter settings apply.

Traditional methods for UL power control are unable to account for the different propagation conditions that may occur for different combinations of BPLs used either simultaneously during one transmission interval or when switching between BPLs in consecutive transmission-time intervals.

Accordingly, this disclosure proposes introducing independent power-control procedures per BPL. In one embodiment, such a power-control procedure comprises: 1) an open-loop part based on the estimated DL path loss for the active and back-up (or "non-active") BPLs in the UE and 2) a closed-loop part where the UL power-control adjustment commands are transmitted from the network and accumulated in the UE independently per active BPL. The UL transmit power is determined from the power-control procedure associated with the active BPL scheduled for transmission.

An advantage of introducing such independent power-control processes per BPL is that it enables accurate UL power control for the data channel, the control channel, and reference signal transmissions. Also, it enables accurate UL power control when several active BPLs are used in combination.

BRIEF DESCRIPTION OF THE DRAWINGS

The accompanying drawings, which are incorporated herein and form part of the specification, illustrate various embodiments.

DETAILED DESCRIPTION

Figure 1:
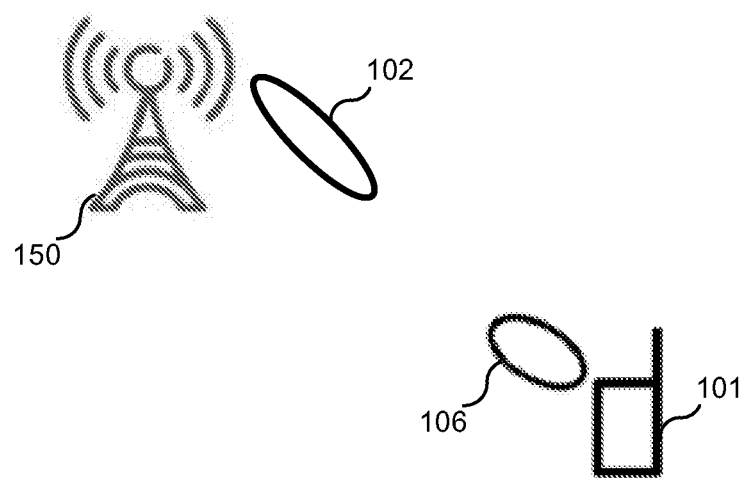
FIG. 1 illustrate the use of monitored (e.g., active and non-active) BPLs for communications between a TRP and a UE.

In FIG. 1 there is shown a TRP 150 (e.g., a base station) utilizing a TRP Rx beam 102 to receive signals from a UE 101 (e.g., control signaling and/or user data), and further showing UE 101 using a UE Tx beam 106 to transmit signals transmitted by TRP 150. In this example, UE Tx beam 106 and TRP Rx beam 102 are the beams that make up an UL BPL. While FIG. 1 illustrates a single TRP communicating with UE 101, in other embodiments two or more TRPs may be communicating with UE 101, wherein one of the TRPs uses an active BPL to communicate with UE 101 and another of the TRPs uses another active BPL to communicate with UE 101.

As mentioned above, traditional methods for UL power control are unable to account for the different propagation conditions that may occur for different combinations of BPLs used either simultaneously during one transmission interval or when switching between BPLs in consecutive transmission-time intervals.

Accordingly, this disclosure describes embodiments of a wireless communication system in which UEs maintain independent power-control procedures associated with one or more monitored BPLs (e.g., one or more active BPLs).

The first step of a power-control procedure is to identify monitored BPLs.

Identifying Monitored BPL

The network (e.g., TRP 150) and UE 101 are assumed to continuously identify and subsequently define one or several monitored BPLs based on at least one of: a) DL common reference signals like BRS; b) scheduled DL UE-specific reference signals like BRRS or CSI-RS; c) scheduled UL reference signals like SRS; and d) some default configurations.

The defining part uses explicit or implicit signaling (e.g., a measurement report based on a DL reference signal). In the case of CSI-RS, each measurement may be associated with an identifier (tag). The identifier (tag) may be interpreted as the BPL index in the following.

Another step of the power-control procedure is obtaining path-loss estimates.

Obtaining Path-Loss Estimates

Let $PL_c^{(n)}$ denote the path-loss estimate for BPL index=n and component carrier index=c.

In one embodiment, the UE estimates the path-loss for a BPL, $PL_c^{(n)}$, based on a DL common reference signal like BRS for which the transmit power level is known.

In another embodiment the UE estimates the path-loss for a BPL, $PL_c^{(n)}$, based on either a DL common reference signal or a DL UE-specific reference signal like the Mobility Reference Signal (MRS), BRRS or CSI-RS for which the transmit power level is known.

In another embodiment at least one monitored or active BPL is identified only with respect to a DL UE-specific BRRS. Here this is referred to as the UE being in BRRS tracking mode for that BPL.

For a UE in BRRS tracking mode the path-loss estimate for a BPL, $PL_c^{(n)}$, is based on at least one of: a) a common reference signal that the UE is configured to use for power control of a BPL; b) the UE-specific reference signal if the transmit power level of the UE-specific reference signal is known to the UE; and c) the last available path-loss estimate before entering BRRS tracking mode in case the UE-specific reference signal is not associated with a known transmit power.

In another embodiment the cellular system is comprised of several component carriers and the UE derives a common path-loss estimate for all supported component carriers.

In another embodiment the cellular system is comprised of several component carriers and the UE derives independent path-loss estimates for all supported component carriers.

In another embodiment the cellular system is comprised of several component-carrier groups and the UE derives common path-loss estimates for the selected component-carrier groups. One component-carrier group can, e.g., be a number of component carriers in the same frequency band while different groups may constitute component carriers in different frequency bands.

Another step of the power-control procedure is Accumulation of power-control adjustments.

Accumulation of Power-Control Adjustments

Let $f_c^{(n)}(t)$ denote the accumulated power-control adjustment at time=t, for UL data-channel transmission for BPL index=n, and component-carrier index=c.

When the UE is scheduled for transmission of a data channel on one active BPL with index n a scheduling grant contains a power-adjustment command $\Delta_f(t)$ which is accumulated over time as:

$$f_c^{(n)}(t)=f_c^{(n)}(t_{old})+\Delta_f(t).$$

Let $g_c^{(n)}(t)$ denote the accumulated power-control adjustment at time=t, for UL control-channel transmission for BPL index=n, and component carrier index=c.

When the UE is scheduled for transmission of a control channel on one active BPL with index n the scheduling grant contains a power-adjustment command $\Delta_g(t)$, which is accumulated over time as:

$$g_c^{(n)}(t)=g_c^{(n)}(t_{old})+\Delta_g(t).$$

In one embodiment the scheduling grant for a data-channel or control-channel transmission is received on one active BPL with index $n=N_1$ in the DL and the power-control adjustment is accumulated for the same active BPL index $n=N_1$.

In another embodiment the scheduling grant for a data-channel or control-channel transmission is received on one active BPL with index $n=N_1$ and the power-control adjustment is applied to one of the other active BPLs, $n \neq N_1$.

In another embodiment the scheduling grant for a data-channel or control-channel transmission is received on one active BPL with index $n=N_1$ and the power-control adjustment is applied to several or all active BPLs with indices $n=N_1, N_2, \ldots$.

In another embodiment the scheduling grant is received on one component carrier with index $c=C_1$ and the power-control adjustment is applied to another component carrier with index $c=C_2$.

In one embodiment the UE resets the accumulated values $f_c^{(n)}(t)=0$, $g_c^{(n)}(t)=0$ for a BPL with index=n when the BPL with index=n is set to active or when it is released.

In another embodiment the UE resets the accumulated values $f_c^{(n)}(t)=0$, $g_c^{(n)}(t)=0$ for a BPL with index=n when a power-control parameter configuration update for a BPL with index=n is received by higher layers, such as the reference signal used for path-loss estimation or the associated power level.

In another embodiment the UE resets the accumulated values $f_c^{(n)}(t)=0$, $g_c^{(n)}(t)=0$ for all BPLs when a power-control parameter configuration update is received by higher layers, such as the reference signal used for path-loss estimation or the associated power level.

In another embodiment the UE resets the accumulated values $f_c^{(n)}(t)=0$, $g_c^{(n)}(t)=0$ for all BPLs when the UE receives a random-access response.

In another embodiment the UE is also configured to use maximum and/or minimum power values which limit the accumulation of power-control adjustment commands accordingly.

Another step of the power-control procedure is setting output powers data transmissions.

Setting Output Powers

In one embodiment, the UE sets the output power for a data-channel transmission on BPL n on a component carrier c as a function of: a) the scheduled bandwidth; b) the estimated path loss $PL_c^{(n)}$; c) the accumulated power-control adjustments $f_c^{(n)}(t)$; and d) parameter configurations provided by higher layers. In one embodiment, the path-loss estimate is scaled with a fractional parameter provided by higher layers and the scaled path-loss estimate is used to set the output power. In another embodiment the output power is also scaled as a function of the data channel transport format, including modulation scheme and code rate.

In one embodiment, the UE sets the output power for a control-channel transmission on BPL n on a component carrier c as a function of: a) the scheduled bandwidth; b) $PL_c^{(n)}$ (the estimated path-loss for BPL n and component carrier c); c) the accumulated power-control adjustments—$g_c^{(n)}(t)$; and d) parameter configurations provided by higher layers. In one embodiment the path loss is also scaled as a function of a parameter provided by higher layers. In another embodiment the output power is also scaled as a function of the number of simultaneous control-channel transmissions on component carrier c. In another embodiment the power for transmission of the UL control channel is also adjusted as a function of the UL control-channel format. In another embodiment the power for transmission of the UL control channel is also adjusted as a function of the time duration, or number of OFDM symbols, used to transmit the UL control channel. In another embodiment the power for transmission of the UL control channel is also adjusted as a function of the message payload size.

In some embodiments, the power-control method also includes a power headroom deriving step.

Power Headroom

The UE derives the available power headroom as the difference between the available output power and the power used for data transmission. The power headroom is delivered to higher layers. In one embodiment the power headroom is derived as the total power headroom for all used component carriers per BPL. In another embodiment the power headroom is derived per component-carrier group per BPL, where a group of component carriers could, for example, belong to the same frequency band. In another embodiment the power headroom is derived per individual component carrier and BPL. In another embodiment the power headroom is derived jointly over all or a subset of all active BPLs.

Figure 2:
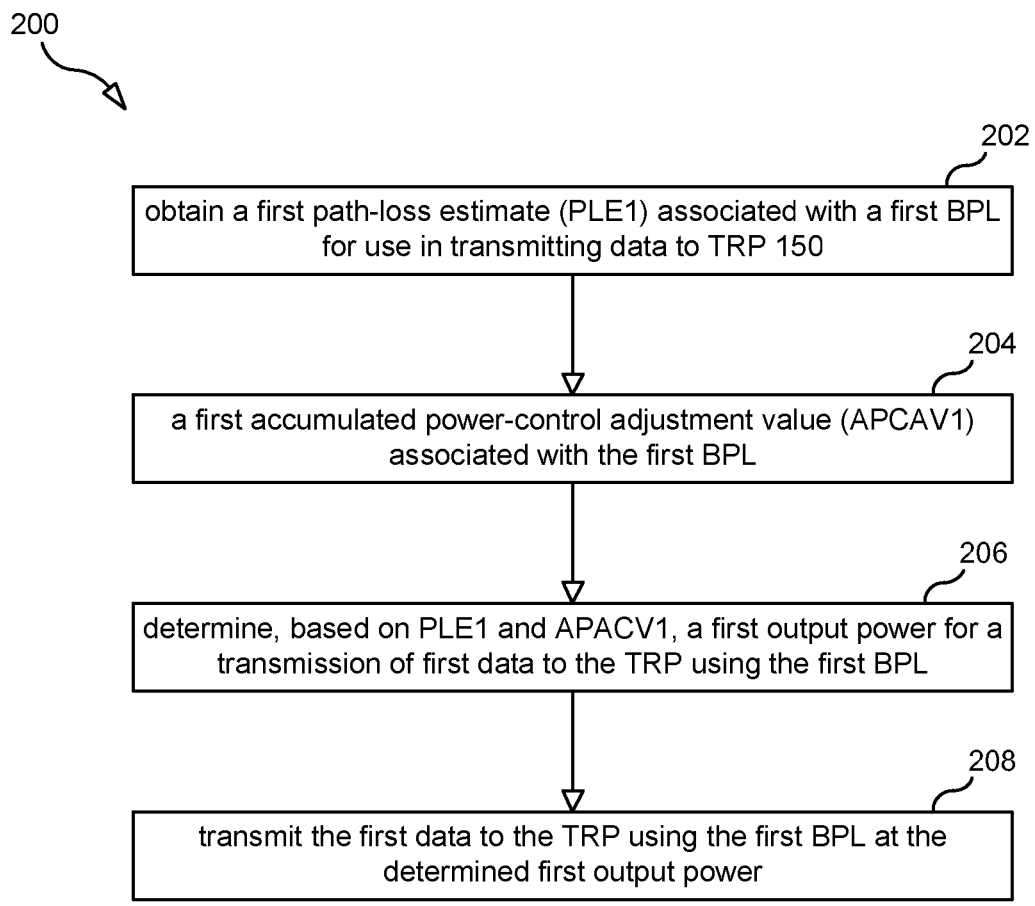
FIG. 2 is a flow chart illustrating a process according to one embodiment.

FIG. 2 is a flow chart illustrating a power control process 200, according to some embodiments. Process 200 may begin in step 202 in which UE 101 obtains a first path-loss estimate associated with a first BPL, wherein the first BPL comprises a first UE Tx beam for use in transmitting data to TRP 150 paired with a first TRP Rx beam established by the TRP for receiving data transmissions from the UE when the UE transmits the data using the first UE Tx beam.

In step 204, UE 101 obtains a first accumulated power-control adjustment value (e.g., $f_c^{(n)}(t)$) associated with the first BPL.

In step 206, based at least in part on the first path-loss estimate associated with the first BPL and the first accumulated power-control adjustment value associated with the first BPL, UE 101 determines a first output power for a transmission of first data (e.g., user data) to the TRP using the first BPL (i.e., using the first UE Tx beam).

In step 208, UE 101 transmits the first data to the TRP using the first BPL at the determined first output power. In the embodiment where the first data is user data the transmission in step 208 occurs on the data channel.

In some embodiments, the method further includes: UE 101 obtaining a second accumulated power-control adjustment value (e.g., $g_c^{(n)}(t)$) associated with the first BPL. The process further includes UE 101, based at least in part on the first path-loss estimate associated with the first BPL and the second accumulated power-control adjustment value associated with the first BPL, determining a second output power for a transmission of second data (e.g., control data) to the TRP using the first BPL. The process may further include UE 101 transmitting the second data to TRP 150 using the first BPL at the determined second output power. When the second data is control data, the control data is transmitted to the TRP on a control channel.

In some embodiments, the step of UE 101 obtaining the first path-loss estimate comprises: UE 101 using a first UE Rx beam to receive a reference signal transmitted by TRP 150 using a first TRP Tx beam, wherein the first UE Rx beam has reciprocity with the first UE Tx beam and UE 101 estimating the path-loss based on a measurement of the reference signal received using the first UE Rx beam. In some embodiments, the reference signal is one of: a common reference signal (e.g., a BRS) for which the transmit power level is known, and a UE-specific reference signal (e.g., MRS, BRRS, CSI-RS) for which the transmit power level is known.

In other embodiments, the first TRP Tx beam and the first UE Rx beam are directly associated through reciprocity to the first UE Tx beam and the first TRP Rx beam in a joint UL/DL BPL.

In other embodiments, the step of UE 101 obtaining the first path-loss estimate comprises UE 101 obtaining the path-loss estimate from TRP 150 (e.g., TRP 150 may receive a signal transmitted by UE 101 using the first BPL and estimate the path-loss based on a measurement of the received signal).

In some embodiments, the step of UE 101 obtaining the first accumulated power-control adjustment value associated with the first BPL comprises: 1) UE 101 initializing the first accumulated power-control adjustment value; 2) UE 101 receiving a message transmitted by TRP 150, wherein the message comprises a power-control adjustment value (PCAV); and 3) UE 101 calculating $APCAV_1 = PCAV + APCAV_1$, wherein $APCAV_1$ is the first accumulated power-control adjustment value.

Figure 3:
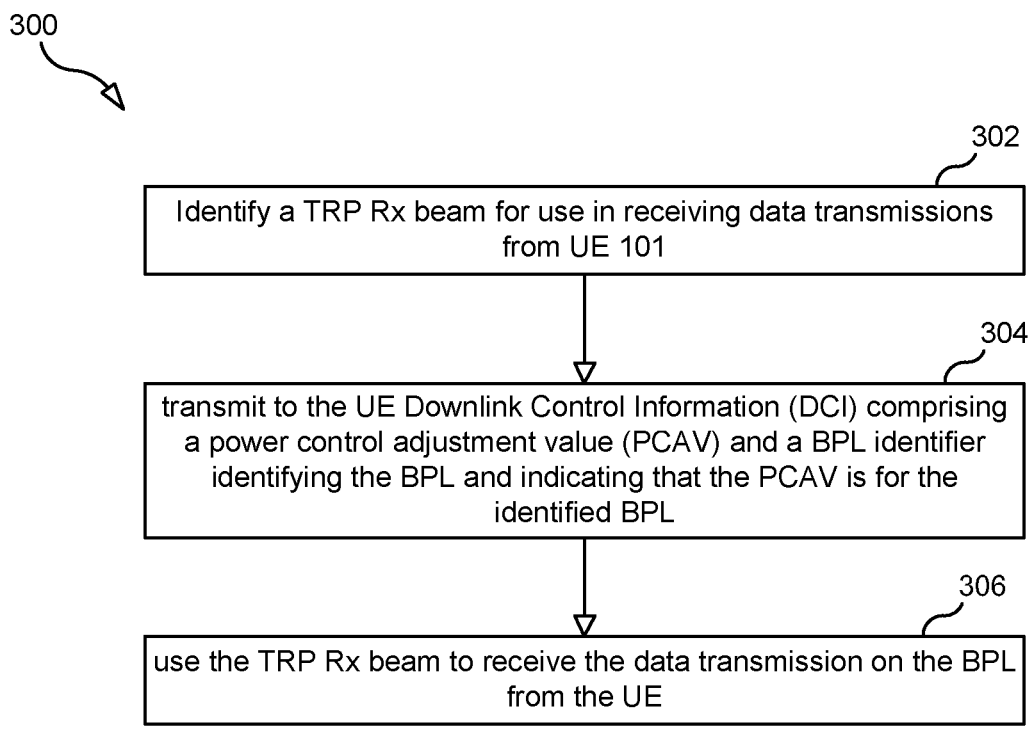
FIG. 3 is a flow chart illustrating a process according to one embodiment.

FIG. 3 is a flow chart illustrating a power control process 300, according to some embodiments. Process 300 may begin in step 302 in which TRP 150 identifies a TRP Rx beam for use in receiving data transmissions from UE 101, wherein the TRP Rx beam is paired with a UE Tx beam (i.e., the TRP Rx beam and the UE Tx beam form an UL BPL).

In step 304, TRP 150 schedules UE 101 to perform a data transmission using the UL BPL, wherein scheduling the UE to perform the data transmission using the UL BPL comprises the TRP transmitting to the UE Downlink Control Information (DCI), which is carried by the PDCCH, wherein the DCI comprises a power control adjustment value and a BPL identifier identifying the UL BPL, the BPL identifier indicating that the PCAV is for the identified the UL BPL.

In step 306, the TRP uses the TRP Rx beam to receive the data transmission on the UL BPL from the UE.

Figure 4:
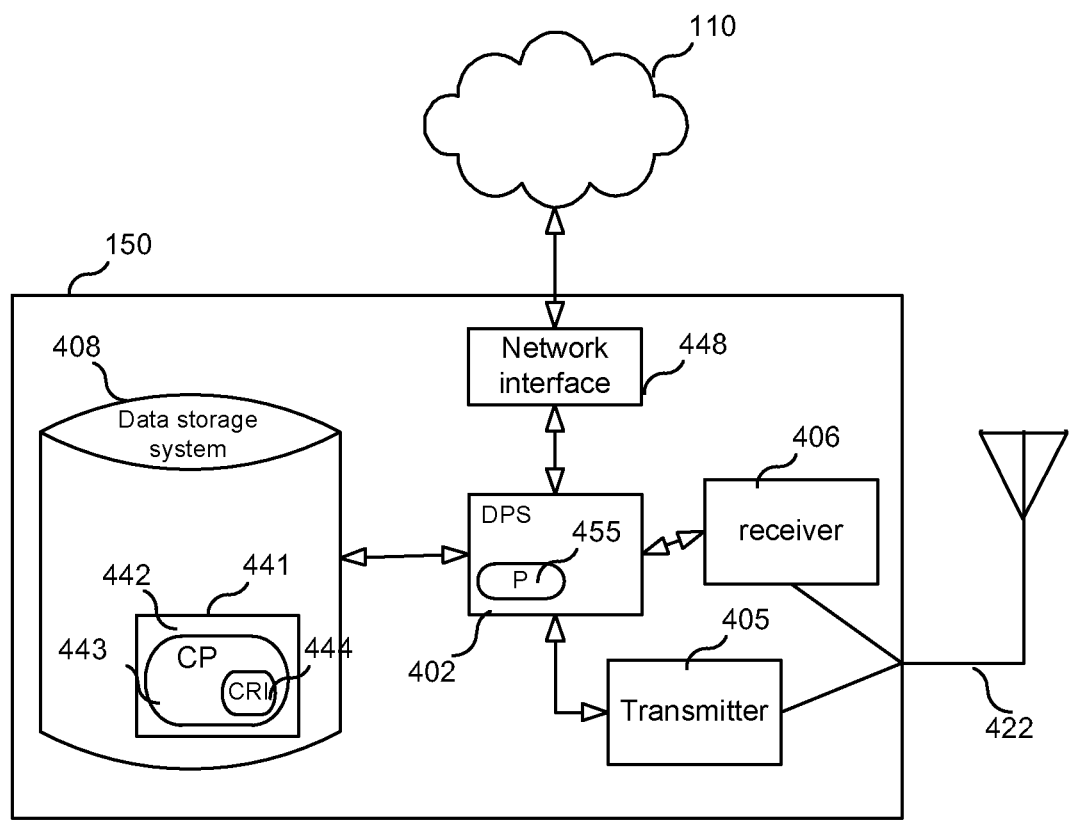
FIG. 4 is a block diagram of a TRP according to some embodiments.

FIG. 4 is a block diagram of TRP 150 according to some embodiments. As shown in FIG. 4, TRP 150 may comprise: a data processing system (DPS) 402, which may include one or more processors (P) 455 (e.g., a general purpose microprocessor and/or one or more other processors, such as an application specific integrated circuit (ASIC), field-programmable gate arrays (FPGAs), and the like); a transmitter 405 and a receiver 406 coupled to an antenna 422 for use in wirelessly communicating with a UE; a network interface 448 for use in connecting TRP 150 to a network 110 (e.g., an Internet Protocol (IP) network) so that TRP 150 can communicate with other devices connected to network 110; and local storage unit (a.k.a., "data storage system") 408, which may include one or more non-volatile storage devices and/or one or more volatile storage devices (e.g., random access memory (RAM)). In embodiments where TRP 150 includes a general purpose microprocessor, a computer program product (CPP) 441 may be provided. CPP 441 includes a computer readable medium (CRM) 442 storing a computer program (CP) 443 comprising computer readable instructions (CRI) 444. CRM 442 may be a non-transitory computer readable medium, such as, but not limited to magnetic media (e.g., a hard disk), optical media (e.g., a DVD), memory devices (e.g., random access memory, flash memory), and the like. In some embodiments, the CRI 444 of computer program 443 is configured such that when executed by data processing system 402, the CRI causes TRP 150 to perform steps described above (e.g., steps described above with reference to the flow charts). In other embodiments, TRP 150 may be configured to perform steps described herein without the need for code. That is, for example, data processing system 402 may consist merely of one or more ASICs. Hence, the features of the embodiments described herein may be implemented in hardware and/or software.

Figure 5:
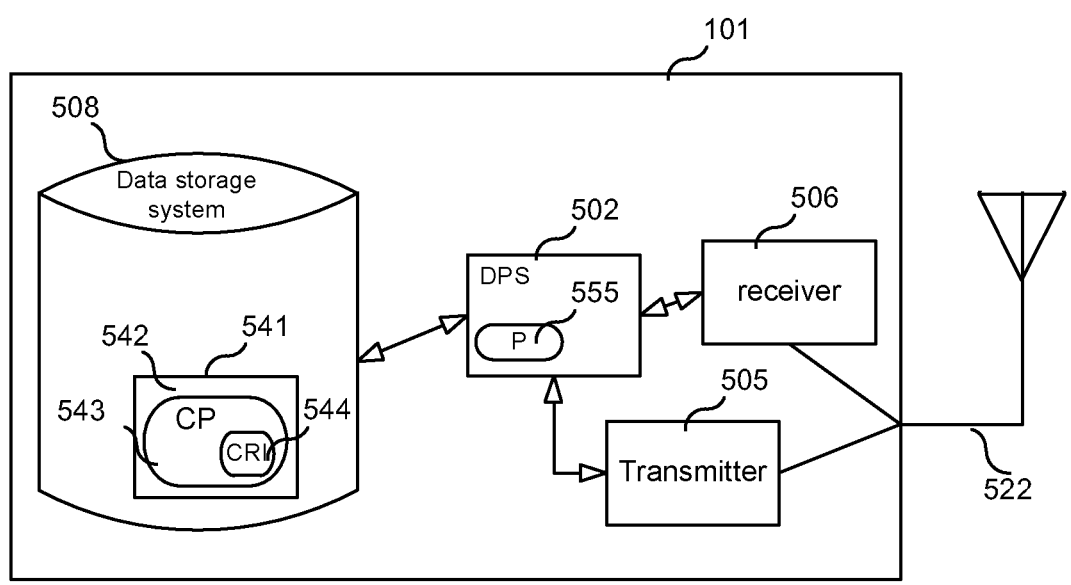
FIG. 5 is a block diagram of a UE according to some embodiments.

FIG. 5 is a block diagram of a UE 101 according to some embodiments. As shown in FIG. 5, UE 101 may comprise: a data processing system (DPS) 502, which may include one or more processors 555 (e.g., a general purpose microprocessor and/or one or more other processors, such as an application specific integrated circuit (ASIC), field-programmable gate arrays (FPGAs), and the like); a transmitter 505 and a receiver 506 coupled to an antenna 522 for use in wirelessly communicating with a radio access network (RAN) node (e.g., a TRP); and local storage unit (a.k.a., "data storage system") 512, which may include one or more non-volatile storage devices and/or one or more volatile storage devices (e.g., random access memory (RAM)). In embodiments where UE 101 includes a general purpose microprocessor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, but not limited to, magnetic media (e.g., a hard disk), optical media (e.g., a DVD), memory devices (e.g., random access memory, flash memory), and the like. In some embodiments, the CRI 544 of computer program 543 is configured such that when executed by data processing system 502, the CRI causes UE 101 to perform steps described above (e.g., steps described above with reference to the flow charts). In other embodiments, UE 101 may be configured to perform steps described herein without the need for code. That is, for example, data processing system 502 may consist merely of one or more ASICs. Hence, the features of the embodiments described herein may be implemented in hardware and/or software.

Figure 6:
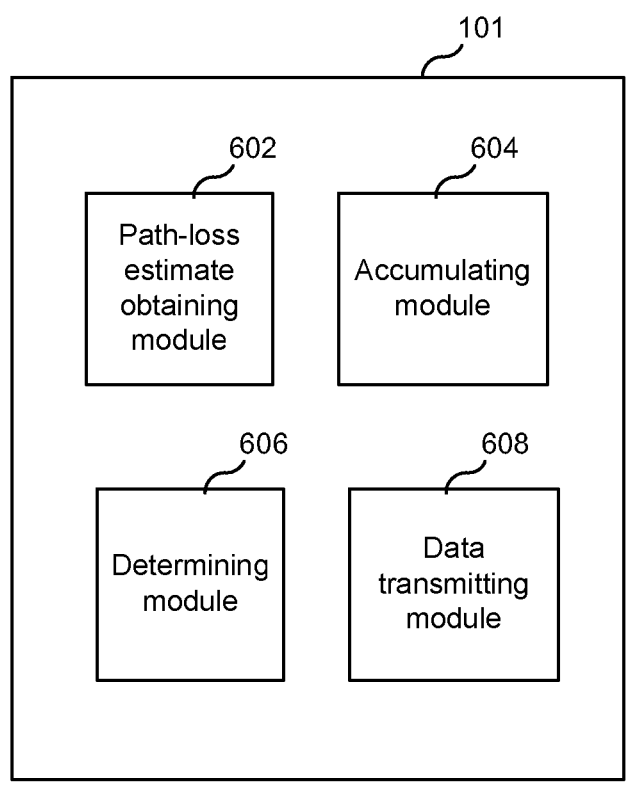
FIG. 6 is a diagram showing functional modules of a UE according to some embodiments.
Figure 7:
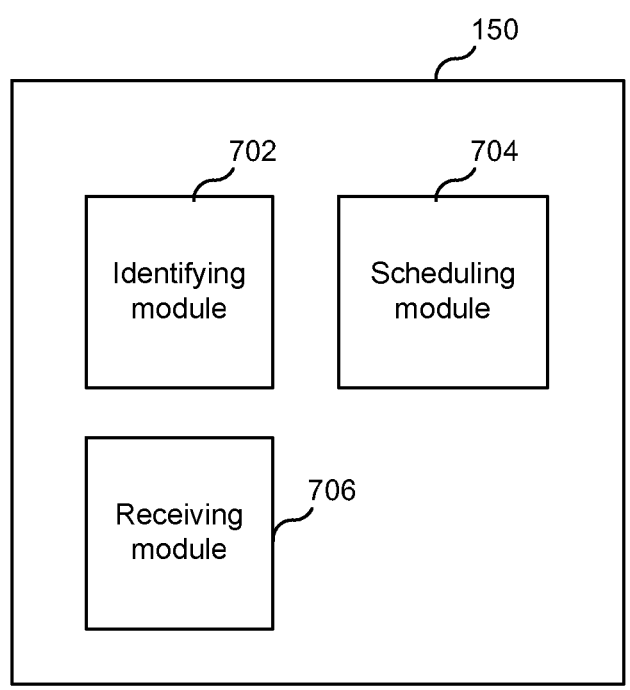
FIG. 7 is a diagram showing functional modules of a TRP according to some embodiments.

FIG. 6 is a diagram showing functional modules of UE 101 according to some embodiments. In the embodiment shown, UE 101 includes: a path-loss obtaining module 602 configured to obtain a first path-loss estimate associated with a first BPL for use in transmitting data to a transmission and reception point, TRP; an accumulating module 604 configured to accumulate a first accumulated power-control adjustment value associated with the first BPL; an output power determining module 606 configured to determine a first output power for a transmission of first data to the TRP using the first BPL (i.e., using a UE Tx beam that is the UE Tx component of the BPL), wherein the determination of the first output power is based at least in part on the first path-loss estimate associated with the first BPL and the first accumulated power-control adjustment value associated with the first BPL; and a data transmitting module 608 for transmitting the first data to the TRP using the first BPL at the determined first output power FIG. 7 is a diagram showing functional modules of TRP 150 according to some embodiments. In the embodiment shown, TRP 150 includes: an identifying module 702 for identifying a TRP Rx beam for use in receiving data transmissions from a UE, wherein the TRP Rx beam is paired with a UE Tx beam (i.e., the TRP Rx beam and the UE Tx beam form an UL BPL); a scheduling module 704 for scheduling the UE to perform a data transmission using the UL BPL, wherein scheduling the UE to perform the data transmission using the UL BPL comprises the TRP transmitting to the UE Downlink Control Information (DCI), which is carried by the PDCCH, wherein the DCI comprises a power control adjustment value and a BPL identifier identifying the UL BPL, the BPL identifier indicating that the PCAV is for the identified the UL BPL; and a receiving module 706 for using the TRP Rx beam to receive the data transmission on the UL BPL from the UE Concise Description of Various Embodiments A1. A method for power control, the method comprising: a UE obtaining a first path-loss estimate associated with a first BPL for use in transmitting data to a transmission and reception point, TRP; the UE obtaining a first accumulated power-control adjustment value associated with the first BPL; based at least in part on the first path-loss estimate associated with the first BPL and the first accumulated power-control adjustment value associated with the first BPL, the UE determining a first output power for a transmission of first data to the TRP using the first BPL; and the UE transmitting the first data to the TRP using the first BPL at the determined first output power.

A2. The method of embodiment 1, wherein the first data is user data, and transmitting the first data to the TRP using the first BPL at the determined first output power comprises transmitting the first data on a data channel.

A3. The method of embodiment A1 or A2, further comprising: the UE obtaining a second accumulated power-control adjustment value associated with the first BPL; based at least in part on the first path-loss estimate associated with the first BPL and the second accumulated power-control adjustment value associated with the first BPL, the UE determining a second output power for a transmission of second data to the TRP using the first BPL; and the UE transmitting the second data to the TRP using the first BPL at the determined second output power, wherein the second data is control data, and the control data is transmitted to the TRP on a control channel.

A4. The method of any one of embodiments A1-A3, wherein the first BPL comprises a first UE Tx beam paired with a first TRP Rx beam, and obtaining the first path-loss estimate comprises: 1) the UE using a first UE Rx beam to receive a reference signal transmitted by the TRP using a first TRP Tx beam, wherein the first UE Rx beam has reciprocity with the first UE Tx beam and 2) the UE estimating the path-loss based on a measurement of the reference signal received using the first UE Rx beam.

A5. The method of embodiment A4, wherein the reference signal is one of: a common reference signal (e.g., a BRS) for which the transmit power level is known, and a UE-specific reference signal (e.g., MRS, BRRS, CSI-RS) for which the transmit power level is known.

A6. The method of any one of embodiments A1-A3, wherein obtaining the first path-loss estimate comprises the UE obtaining the path-loss estimate from the TRP.

A7. The method of any one of embodiments A1-A6, wherein obtaining the first accumulated power-control adjustment value associated with the first BPL comprises: initializing the first accumulated power-control adjustment value; receiving a message transmitted by a TRP, wherein the message comprises a power-control adjustment value, PCAV; and calculating $APCAV_1=PCAV+APCAV_1$, wherein $APCAV_1$ is the first accumulated power-control adjustment value.

B1. A UE configured to perform a power control method, the UE comprising: a path-loss obtaining module configured to obtain a first path-loss estimate associated with a first BPL for use in transmitting data to a transmission and reception point, TRP; an accumulating module configured to accumulate a first accumulated power-control adjustment value associated with the first BPL; an output power determining module configured to determine a first output power for a transmission of first data to the TRP using the first BPL, wherein the determination of the first output power is based at least in part on the first path-loss estimate associated with the first BPL and the first accumulated power-control adjustment value associated with the first BPL; and a data transmitting module for transmitting the first data to the TRP using the first BPL at the determined first output power.

C1. A UE, the UE being adapted to: obtain a first path-loss estimate associated with a first BPL for use in transmitting data to a transmission and reception point, TRP; obtain a first accumulated power-control adjustment value associated with the first BPL; determine, based at least in part on the first path-loss estimate associated with the first BPL and the first accumulated power-control adjustment value associated with the first BPL, a first output power for a transmission of first data to the TRP using the first BPL; and transmit the first data to the TRP using the first BPL at the determined first output power.

D1. A method for power control, the method comprising: a TRP identifying a TRP Rx beam for use in receiving data transmissions from a UE, wherein the TRP Rx beam is paired with a UE Tx beam (i.e., the TRP Rx beam and the UE Tx beam form an UL BPL); the TRP scheduling the UE to perform a data transmission using the UL BPL, wherein scheduling the UE to perform the data transmission using the UL BPL comprises the TRP transmitting to the UE Downlink Control Information (DCI), which is carried by the PDCCH, wherein the DCI comprises a power control adjustment value and a BPL identifier identifying the BPL, the BPL identifier indicating that the PCAV is for the identified the BPL; and the TRP using the TRP Rx beam to receive the data transmission on the BPL from the UE.

E1. A TRP, the TRP comprising: an identifying module for identifying a TRP Rx beam for use in receiving data transmissions from a UE, wherein the TRP Rx beam is paired with a UE Tx beam (i.e., the TRP Rx beam and the UE Tx beam form an UL BPL); a scheduling module for scheduling the UE to perform a data transmission using the UL BPL, wherein scheduling the UE to perform the data transmission using the UL BPL comprises the TRP transmitting to the UE Downlink Control Information (DCI), which is carried by the PDCCH, wherein the DCI comprises a power control adjustment value and a BPL identifier identifying the BPL, the BPL identifier indicating that the PCAV is for the identified the BPL; and a receiving module for using the TRP Rx beam to receive the data transmission on the BPL from the UE.

F1. A TRP, the TRP being adapted to: identify a TRP Rx beam for use in receiving data transmissions from a UE, wherein the TRP Rx beam is paired with a UE Tx beam (i.e., the TRP Rx beam and the UE Tx beam form an UL BPL); schedule the UE to perform a data transmission using the UL BPL, wherein scheduling the UE to perform the data transmission using the UL BPL comprises the TRP transmitting to the UE Downlink Control Information (DCI), which is carried by the PDCCH, wherein the DCI comprises a power control adjustment value and a BPL identifier identifying the BPL, the BPL identifier indicating that the PCAV is for the identified the BPL; and use the TRP Rx beam to receive the data transmission on the BPL from the UE.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

5G Fifth-Generation Mobile Radio Access
BBU Base-Band Unit
BLER Block-Error Rate
BPL Beam-Pair Link
BRRS Beam-Refinement Reference Signal
BRS Beam-Reference Signal
CE Control Element
CSI-RS Channel-State Information Reference Signal
DCI Downlink Control Information (message)
eNB enhanced Node B (i.e., Base Station)
HARQ Hybrid Automatic Repeat reQuest
LTE Long-Term Evolution
MAC Medium-Access Control
NR New Radio
PDCCH Physical Downlink Control Channel
RRC Radio-Resource Control
RSRP Reference Signal Received Power
Rx Receiver
SRS Sounding Reference Signal
Tx Transmitter
TRP Transmission and Reception Point

The invention claimed is:

1. A method for power control, the method comprising:
a user equipment (UE) obtaining a first path-loss estimate associated with a first beam pair link (BPL) for use in transmitting data to a transmission and reception point (TRP);
the UE obtaining a second path-loss estimate associated with a second BPL for use in transmitting data to the TRP, wherein the second BPL is different than the first BPL;
the UE obtaining a first accumulated power-control adjustment value for the first BPL;
the UE obtaining a second accumulated power-control adjustment value for the second BPL;
based at least in part on the first path-loss estimate associated with the first BPL and the first accumulated power-control adjustment value for the first BPL, the UE determining a first output power for a transmission of first data to the TRP using the first BPL;
based at least in part on the second path-loss estimate associated with the second BPL and the second accumulated power-control adjustment value for the second BPL, the UE determining a second output power for a transmission of second data to the TRP using the second BPL;

the UE transmitting the first data to the TRP using the first BPL at the determined first output power; and the UE transmitting the second data to the TRP using the second BPL at the determined second output power.

2. The method of claim 1, wherein the first data is user data, and transmitting the first data to the TRP using the first BPL at the determined first output power comprises transmitting the first data on a data channel.

3. The method of claim 1, further comprising:

the UE obtaining a third accumulated power-control adjustment value for the first BPL;

based at least in part on the first path-loss estimate associated with the first BPL and the third accumulated power-control adjustment value for the first BPL, the UE determining a third output power for a transmission of third data to the TRP using the first BPL; and the UE transmitting the third data to the TRP using the first BPL at the determined third output power, wherein the third data is control data, and the control data is transmitted to the TRP on a control channel.

4. The method of claim 1, wherein the first BPL comprises a first UE Tx beam paired with a first TRP Rx beam, and obtaining the first path-loss estimate comprises: 1) the UE using a first UE Rx beam to receive a reference signal transmitted by the TRP using a first TRP Tx beam, wherein the first UE Rx beam has reciprocity with the first UE Tx beam and 2) the UE estimating the path-loss based on a measurement of the reference signal received using the first UE Rx beam.

5. The method of claim 4, wherein the reference signal is one of:

a common reference signal for which the transmit power level is known, and a UE-specific reference signal for which the transmit power level is known.

6. The method of claim 1, wherein obtaining the first path-loss estimate comprises the UE obtaining the path-loss estimate from the TRP.

7. The method of claim 1, wherein obtaining the first accumulated power-control adjustment value associated with the first BPL comprises:

receiving a message transmitted by a TRP, wherein the message comprises a power-control adjustment value, PCAV; and calculating APCAV1=PCAV+I1, wherein APCAV1 is the first accumulated power-control adjustment value and I1 is a first initial value.

8. The method of claim 7, wherein the message is a scheduling grant received on a second BPL that is different than the first BPL.

9. The method of claim 7, wherein the message is a scheduling grant received on the first BPL, and the method further comprises the UE using the first accumulated power-control adjustment value associated with the first BPL to determine a second output power for a transmission of data to the TRP using a second BPL.

10. The method of claim 7, wherein the message is a scheduling grant received on one component carrier and the first accumulated power-control adjustment value is applied to another component carrier.

11. The method of claim 7, wherein obtaining the second accumulated power-control adjustment value associated with the second BPL comprises:

receiving a second message transmitted by a TRP, wherein the second message comprises a power-control adjustment value, PCAV2; and calculating APCAV2=PCAV2+I2, wherein APCAV2 is the second accumulated power-control adjustment value and I2 is a second initial value.

12. The method of claim 1, wherein obtaining the path loss estimate comprises the UE deriving one of: i) a common path-loss estimate for a plurality of component carriers and ii) independent path-loss estimates for each of a plurality of component carriers.

13. The method of claim 1, obtaining the path loss estimate comprises the UE deriving a common path-loss estimate for a selected component-carrier group.

14. A user equipment, UE, the UE comprising:

a receiver;

a transmitter;

memory; and processing circuitry coupled to the memory, wherein the UE is configured to:

obtain a first path-loss estimate associated with a first beam pair link (BPL) for use in transmitting data to a transmission and reception point, TRP;

obtain a second path-loss estimate associated with a second BPL for use in transmitting data to the TRP;

obtain a first accumulated power-control adjustment value for the first BPL;

obtain a second accumulated power-control adjustment value for the second BPL;

determine, based at least in part on the first path-loss estimate associated with the first BPL and the first accumulated power-control adjustment value for the first BPL, a first output power for a transmission of first data to the TRP using the first BPL;

determine, based at least in part on the second path-loss estimate associated with the second BPL and the second accumulated power-control adjustment value for the second BPL, a second output power for a transmission of second data to the TRP using the second BPL;

transmit the first data to the TRP using the first BPL at the determined first output power and transmit the second data to the TRP using the second BPL at the determined second output power.

15. The UE of claim 14, wherein:

the UE is operable to obtain a third accumulated power-control adjustment value for the first BPL;

the UE is configured such that, based at least in part on the first path-loss estimate associated with the first BPL and the third accumulated power-control adjustment value for the first BPL, the UE determines a third output power for a transmission of third data to the TRP using the first BPL; and the UE is configured to transmit the third data to the TRP using the first BPL at the determined third output power, wherein the third data is control data, and the control data is transmitted to the TRP on a control channel.

16. The UE of claim 14, wherein the first BPL comprises a first UE Tx beam paired with a first TRP Rx beam, and the UE is configured to obtain the first path-loss estimate by performing a process comprising:

the UE using a first UE Rx beam to receive a reference signal transmitted by the TRP using a first TRP Tx beam, wherein the first UE Rx beam has reciprocity with the first UE Tx beam, and the UE estimating the path-loss based on a measurement of the reference signal received using the first UE Rx beam.

17. The UE of claim 14, wherein the UE is configured to obtain the first path-loss estimate by obtaining the path-loss estimate from the TRP.

18. The UE of claim 14, wherein the UE is configured to obtain the first accumulated power-control adjustment value associated with the first BPL by performing a process comprising:

receiving a message transmitted by a TRP, wherein the message comprises a power-control adjustment value, PCAV; and calculating APCAV1=PCAV+I1, wherein APCAV1 is the first accumulated power-control adjustment value and I1 is a first initial value.

19. A method for power control, the method comprising:

a transmission point (TRP) identifying a TRP receive (Rx) beam for use in receiving data transmissions from a user equipment (UE), wherein the TRP Rx beam is paired with a UE transmit (Tx) beam and the TRP Rx beam and the UE Tx beam form a beam pair link (BPL);

the TRP scheduling the UE to perform a first data transmission using the BPL, wherein scheduling the UE to perform the first data transmission using the BPL comprises the TRP transmitting to the UE a first Downlink Control Information (DCI) message which is carried by the PDCCH, wherein the first DCI message comprises a BPL identifier identifying the BPL and a first power control adjustment value (PCAV1) for use by the UE in calculating a first accumulated power control adjustment value for the BPL identified by the BPL identifier, the BPL identifier indicating that the PCAV1 is for the identified BPL;

the TRP using the TRP Rx beam to receive the first data transmission on the BPL from the UE;

the TRP scheduling the UE to perform a second data transmission using the BPL, wherein scheduling the UE to perform the second data transmission using the BPL comprises the TRP transmitting to the UE a second DCI message which is carried by the PDCCH, wherein the second DCI message comprises a BPL identifier identifying the BPL and a second power control adjustment value (PCAV2) for use by the UE in calculating a second accumulated power control adjustment value for the BPL identified by the BPL identifier, the BPL identifier indicating that the PCAV2 is for the identified BPL; and the TRP using the TRP Rx beam to receive the second data transmission on the BPL from the UE, wherein the second accumulated power control adjustment value (PCAV2) for the BPL is separate from the first accumulated power control adjustment value (PCAV1) for the BPL.

20. A transmission point (TRP), the TRP comprising:
a receiver;
a transmitter;
memory; and
processing circuitry coupled to the memory, wherein the TRP is configured to:

identify a TRP receive (Rx) beam for use in receiving data transmissions from a user equipment (UE), wherein the TRP Rx beam is paired with a UE transmit (Tx) beam and the TRP Rx beam and the UE Tx beam form a beam pair link (BPL);

schedule the UE to perform a data transmission using the BPL, wherein scheduling the UE to perform the data transmission using the BPL comprises the TRP transmitting to the UE a first Downlink Control Information (DCI) message, which is carried by the PDCCH, wherein the first DCI message comprises a BPL identifier identifying the BPL and a first power control adjustment value (PCAV1) for use by the UE in calculating a first accumulated power control adjustment value for the BPL identified by the BPL identifier, the BPL identifier indicating that the PCAV1 is for the identified the BPL;

use the TRP Rx beam to receive the first data transmission on the BPL from the UE;

schedule the UE to perform a second data transmission using the BPL, wherein scheduling the UE to perform the second data transmission using the BPL comprises the TRP transmitting to the UE a second DCI message which is carried by the PDCCH, wherein the second DCI message comprises a BPL identifier identifying the BPL and a second power control adjustment value (PCAV2) for use by the UE in calculating a second accumulated power control adjustment value for the BPL identified by the BPL identifier, the BPL identifier indicating that the PCAV2 is for the identified BPL; and use the TRP Rx beam to receive the second data transmission on the BPL from the UE, wherein the second accumulated power control adjustment value (PCAV2) for the BPL is separate from the first accumulated power control adjustment value (PCAV1) for the BPL.

21. A user equipment (UE), comprising:
a receiver;
a transmitter;
memory; and
processing circuitry coupled to the memory, wherein the UE is configured to:

obtain a first path-loss estimate associated with a first beam pair link (BPL) for use in transmitting user plane data to a transmission and reception point (TRP);

obtain a first accumulated power-control adjustment value for the first BPL;

obtain a second accumulated power-control adjustment value for the first BPL;

based at least in part on the first path-loss estimate and the first accumulated power-control adjustment value, determine a first output power for a transmission of user plane data to the TRP using the first BPL;

based at least in part on the first path-loss estimate and the second accumulated power-control adjustment value, determine a second output power for a transmission of control plane data to the TRP using the first BPL;

transmit, using a data channel, the user plane data to the TRP using the first BPL at the determined first output power; and transmit, using a control channel, the control plane data to the TRP using the first BPL at the determined second output power.

* * * * *